United States Patent
Muthu

(10) Patent No.: US 10,373,239 B2
(45) Date of Patent: Aug. 6, 2019

(54) BUTTON LOG-IN IN A USER INTERFACE

(71) Applicant: eBay Inc., San Jose, CA (US)

(72) Inventor: Arunachalam Muthu, Fremont, CA (US)

(73) Assignee: eBay Inc., San Jose, CA (US)

( * ) Notice: Subject to any disclaimer, the term of this patent is extended or adjusted under 35 U.S.C. 154(b) by 292 days.

(21) Appl. No.: 15/360,773

(22) Filed: Nov. 23, 2016

(65) Prior Publication Data

US 2017/0076360 A1  Mar. 16, 2017

Related U.S. Application Data

(63) Continuation of application No. 13/705,401, filed on Dec. 5, 2012, now Pat. No. 9,519,926.

(51) Int. Cl.
*G06F 17/30* (2006.01)
*G06Q 30/06* (2012.01)
*G06Q 30/08* (2012.01)

(52) U.S. Cl.
CPC ..... *G06Q 30/0635* (2013.01); *G06Q 30/0625* (2013.01); *G06Q 30/0641* (2013.01); *G06Q 30/08* (2013.01)

(58) Field of Classification Search
CPC .................................................. G06Q 30/0635
See application file for complete search history.

(56) References Cited

U.S. PATENT DOCUMENTS

| 9,519,926 | B2 | 12/2016 | Muthu |
| 2002/0178213 | A1 | 11/2002 | Parry |
| 2007/0100802 | A1* | 5/2007 | Celik .............. G06F 17/30386 |
| 2011/0035275 | A1 | 2/2011 | Frankel et al. |
| 2012/0089450 | A1 | 4/2012 | Anantha et al. |

(Continued)

OTHER PUBLICATIONS

Google wallet checkout gains support for mobile websites (2012). . Chatham: Newstex. Retrieved from http://search.proquest.com/docview/1125274807?accountid=14753.*

(Continued)

*Primary Examiner* — Kathleen Palavecino

(74) *Attorney, Agent, or Firm* — Shook, Hardy & Bacon L.L.P.

(57) ABSTRACT

Log-in information for a client device is stored. A search query is received from the client device and search results obtained, each search result identifying a transaction having a transaction provider. Transaction provider information is retrieved for one or more of the identified transaction providers from the search results, the transaction provider information including transaction instructions. A user interface screen is formed presenting the search results including a button associated with each search result, each button configured to, in response to selection of the button, initiate a transaction through the corresponding transaction provider, wherein the initiating includes executing the transaction instructions contained in the transaction provider information for the corresponding transaction provider, the initiation of the transaction further including the server device passing information regarding log-in information for a user of the client device, based on the first data structure, to the transaction provider.

20 Claims, 16 Drawing Sheets

(56) References Cited

U.S. PATENT DOCUMENTS

| | | | |
|---|---|---|---|
| 2013/0297425 A1* | 11/2013 | Wallaja | G06Q 20/4014 705/14.64 |
| 2013/0332277 A1 | 12/2013 | Faith et al. | |
| 2014/0156465 A1 | 6/2014 | Muthu | |
| 2014/0279274 A1 | 9/2014 | Subbarao et al. | |
| 2014/0316935 A1 | 10/2014 | Robertson | |

OTHER PUBLICATIONS

"U.S. Appl. No. 13/705,401, Examiner Interview Summary dated Jun. 30, 2015", 3 pgs.

"U.S. Appl. No. 13/705,401, Examiner Interview Summary dated Oct. 29, 2015", 3 pgs.

"U.S. Appl. No. 13/705,401, Final Office Action dated Sep. 8, 2015", 31 pgs.

"U.S. Appl. No. 13/705,401, Non Final Office Action dated Apr. 29, 2015", 26 pgs.

"U.S. Appl. No. 13/705,401, Notice of Allowance dated Aug. 12, 2016", 21 pgs.

"U.S. Appl. No. 13/705,401, Response filed Jul. 28, 2015 to Non Final Office Action dated Apr. 29, 2015", 14 pgs.

"U.S. Appl. No. 13/705,401, Response filed Dec. 8, 2015 to Final Office Action dated Sep. 8, 2015", 12 pgs.

\* cited by examiner

STORE 4

SECURE CHECKOUT                               > USER LOGIN > CONFIRM ORDER > PRINT SUMMARY >

502 ~ 1. PAYMENT OPTIONS              504 ~ 2. BILLING ADDRESS
PLEASE ENTER YOUR CREDIT CARD INFORMATION    ENTER INFORMATION EXACTLY AS IT APPEARS ON YOUR CREDIT CARD STATEMENT:

CREDIT CARD        [SELECT CREDIT CARD ▼]    FIRST NAME *        [FIRST NAME]
CARD NUMBER        [CREDIT CARD NUMBER]      LAST NAME *         [LAST NAME]
                                             COMPANY             [(OPTIONAL)]
CREDIT CARD        [CVV]                     STREET *            [123 MAIN ST.]
SECURITY CODE                                ADDRESS
EXPIRATION DATE    MONTH  YEAR               CITY *              [CITY]
                   [01 ▼] [2012 ▼]           STATE/PROVINCE *    [CALIFORNIA ▼]
                                             ZIP/POSTAL CODE *   [ZIP]
                                             COUNTRY *           [USA ▼]
                                             DAY PHONE *         [(555) 867-5309]
                                             EVENING PHONE       [EVENING PHONE]

STORE 4

YOUR ORDER SUMMARY

DESCRIPTION
CURRENT PURCHASE

YOU'LL BE ABLE TO SEE YOUR
ORDER BEFORE YOU PAY

REVIEW YOUR INFORMATION

PAYPAL™

CONFIRM PAYMENT
PAYMENT METHODS   CHANGE
⦿ CREDIT/DEBIT CARD VISA XXXX-XXXX-XXXX-1234

○ BILL ME LATER®, A PAYPAL™ SERVICE

CONTACT INFORMATION   CHANGE
NAME@EMAIL.COM
(555) 867-5309
CONFIRM PAYMENT ~602

FIG. 6

BUTTON LOG-IN IN A USER INTERFACE

PRIORITY

The This application is a continuation of and claims the benefit of priority to U.S. patent application Ser. No. 13/705,401, filed on Dec. 5, 2012, which is hereby incorporated by reference herein in its entirety.

BACKGROUND

The advent of mobile devices with location determination capabilities has sparked development of a wide variety of mechanisms to present search results, and particularly for search results of a product to purchase. For example, users wishing to purchase a particular product can perform a search on the product and receive results, with the results presented in a split screen view having a list of stores carrying the product on one side and a map showing the locations of the stores on the other side.

BRIEF DESCRIPTION OF DRAWINGS

FIG. 3 is a screen capture illustrating example output of a method, in accordance with an example embodiment, of a first step of purchasing a selected item.

FIG. 4 is a screen capture illustrating additional example output of a method, in accordance with an example embodiment, of purchasing a selected item.

FIG. 5 is a screen capture illustrating additional example output of a method, in accordance with an example embodiment, of purchasing a selected item.

FIG. 6 is a screen capture illustrating example output of a method, in accordance with another example embodiment, of a first step of purchasing a selected item.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Although the present embodiments have been described with reference to specific example embodiments, it will be evident that various modifications and changes may be made to these embodiments without departing from the broader spirit and scope of the embodiments. Accordingly, the specification and drawings are to be regarded in an illustrative rather than a restrictive sense.

In an example embodiment, a user performing a search on a product, where the search results are presented in a manner that includes a map showing locations where the product may be purchased, may be presented with an option to purchase the item using a button presented in the map view. Activation of the button brings the user either directly or indirectly (such as through a log-in page) to a payment page or shopping cart checkout where payment options may be selected.

Figure 1:
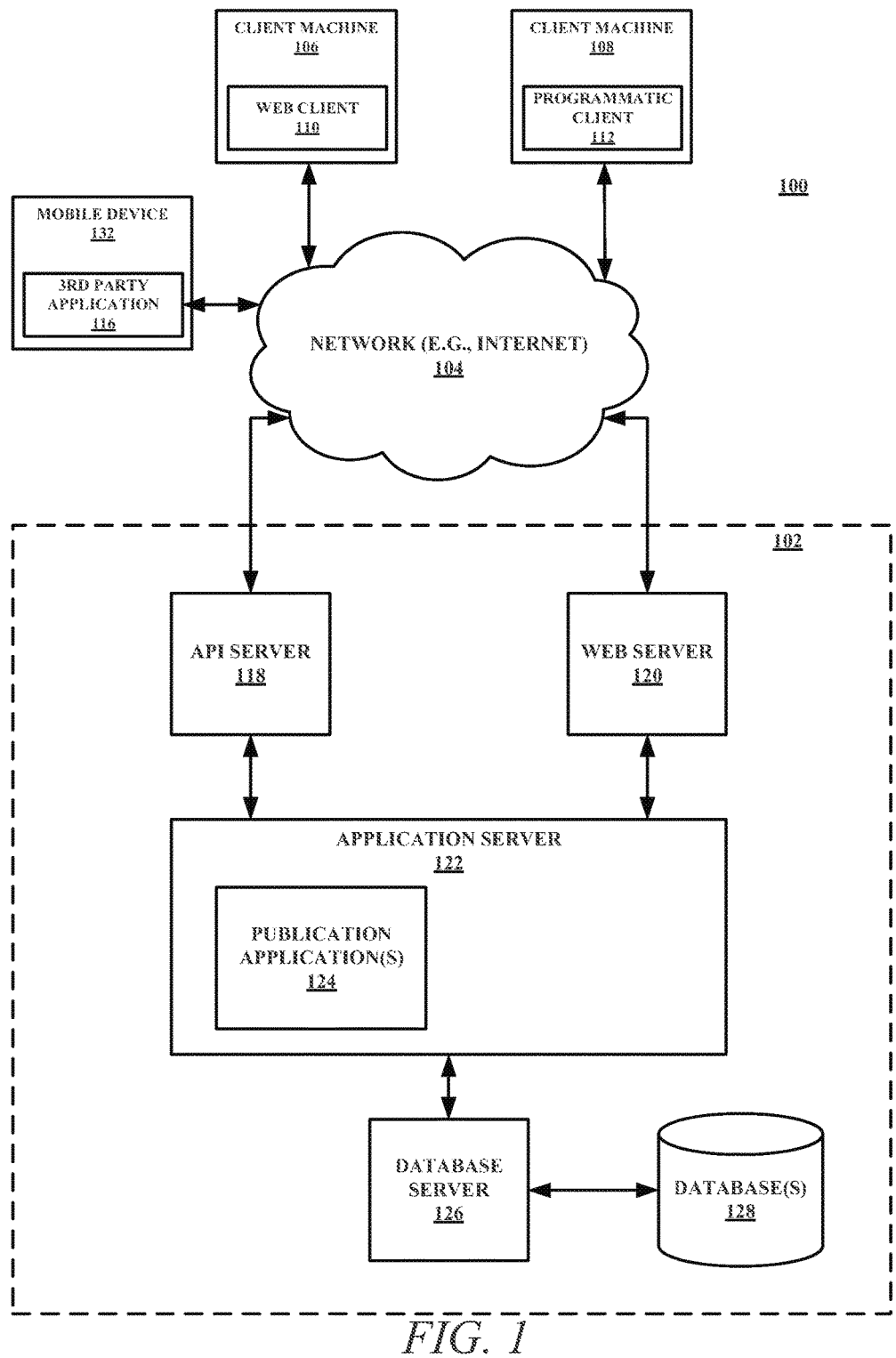
FIG. 1 is a network diagram depicting a networked or network based system, according to an example embodiment, having a client-server architecture configured for exchanging data over a network.

FIG. 1 is a network diagram depicting a networked or network-based system, according to an example embodiment, having a client-server architecture configured for exchanging data over a network. For example, the network system 100 may include a network-based publisher 102 where clients may communicate and exchange data within the network system 100. The data may pertain to various functions (e.g., online item purchases) and aspects (e.g., managing content and user reputation values) associated with the network system 100 and its users. Although illustrated herein as a client-server architecture as an example, other embodiments may include other network architectures, such as a peer-to-peer or distributed network environment.

A data exchange platform, in an example form of a network-based publisher 102, may provide server-side functionality, via a network 104 (e.g., the Internet) to one or more clients. The one or more clients may include users that utilize the network system 100 and more specifically, the network-based publisher 102, to exchange data over the network 104. These transactions may include transmitting, receiving (communicating) and processing data to, from, and regarding content and users of the network system 100. The data may include, but are not limited to, content and user data such as feedback data; user reputation values; user profiles; user attributes; product and service reviews and information, such as pricing and descriptive information; product, service, manufacture, and vendor recommendations and identifiers; product and service listings associated with buyers and sellers; auction bids; and transaction data, among other things.

In various embodiments, the data exchanges within the network system 100 may be dependent upon user-selected functions available through one or more client or user interfaces (UIs). The UIs may be associated with a client machine, such as a client machine 106 using a web client 110. The web client 110 may be in communication with the network-based publisher 102 via a web server 120. The UIs may also be associated with a client machine 108 using a programmatic client 112, such as a client application, or a third party server or a mobile device 132 hosting a third party application 116. It can be appreciated in various embodiments the client machine 106, 108, or third party application 116 may be associated with a buyer, a seller, a third party electronic commerce platform, a payment service provider, or a shipping service provider, each in communication with the network-based publisher 102 and optionally each other. The buyers and sellers may be any one of individuals, merchants, or service providers, among other things.

A mobile device 132 may also be in communication with the network-based publisher 102 via a web server 120. The mobile device 132 may include a portable electronic device providing at least some of the functionalities of the client machines 106 and 108. The mobile device 132 may include a third party application 116 (or a web client 110) configured to communicate with application server 122. Although only one mobile device 132 is shown, it will be appreciated that in practice there may be many mobile devices 132. That is, as used herein, the term "mobile device 132" may include plural mobile devices 132, depending on context. In some instances herein, the mobile device 132 may be referred to as a "user device." Further, as is well known in the art, the mobile devices 132, and non-mobile devices as well, may be in contact with a GPS (global positioning system) or other suitable technology for determining the location of such devices.

Turning specifically to the network-based publisher 102, an application program interface (API) server 118 and a web server 120 are coupled to, and provide programmatic and web interfaces respectively to, one or more application servers 122. The application servers 122 host one or more publication application(s) 124. The application servers 122 are, in turn, shown to be coupled to one or more database server(s) 126 that facilitate access to one or more database(s) 128.

In one embodiment, the web server 120 and the API server 118 communicate and receive data pertaining to listings, transactions, and feedback, among other things, via various user input tools. For example, the web server 120 may send and receive data to and from a toolbar or webpage on a browser application (e.g., web client 110) operating on a client machine (e.g., client machine 106). The API server 118 may send and receive data to and from an application (e.g., programmatic client 112 or third party application 116) running on another client machine (e.g., client machine 108 or a third party server).

The publication application(s) 124 may provide a number of publisher functions and services (e.g., listing, payment, etc.) to users that access the network-based publisher 102. For example, the publication application(s) 124 may provide a number of services and functions to users for listing goods and/or services for sale, facilitating transactions, and reviewing and providing feedback about transactions and associated users.

FIG. 1 also illustrates a third party application 116 that may execute on a third party server and may have programmatic access to the network-based publisher 102 via the programmatic interface provided by the API server 118. For example, the third party application 116 may use information retrieved from the network-based publisher 102 to support one or more features or functions on a website hosted by the third party. The third party website may, for example, provide one or more listing, feedback, publisher or payment functions that are supported by the relevant applications of the network-based publisher 102.

The network-based publisher 102 may provide a multitude of feedback, reputation, aggregation, listing, and pricesetting mechanisms whereby a user may be a seller or buyer who lists or buys goods and/or services (e.g., for sale) published by the network-based publisher 102.

Figure 2:
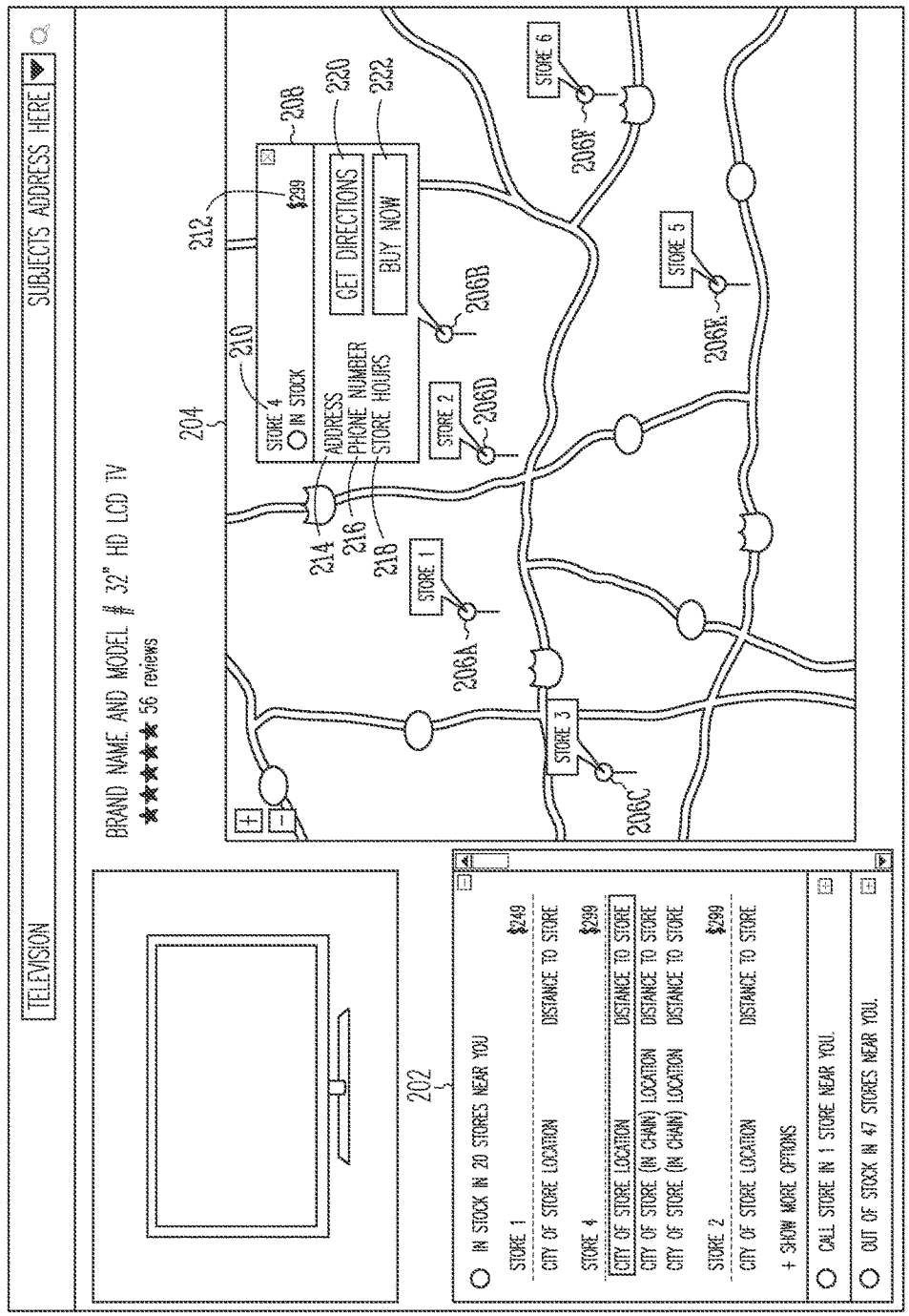
FIG. 2 is a screen capture illustrating output of a method, in accordance with an example embodiment, of presenting product search results.

FIG. 2 is a screen capture illustrating output 200 of a method, in accordance with an example embodiment, of presenting product search results. The output 200 includes a split screen, including a store listing 202 and a map view 204. The store listing 202 displays a list of stores having a selected product in stock. The map view 204 displays various locations 206*a*-206*f* where the selected product is in stock. These locations 206*a*-206*f* represent the locations of the stores in the store listing 202, to the extent they are present within the confines of the current map shown in the map view 204.

Also displayed in the map view 204 is a store window 208. The store window 208 appears when the user navigates a pointer over one of the locations 206*b* on the map (the store window 208 can either pop up automatically when the navigation is made, or may appear when the user clicks on the location 206*b* using a mouse or similar input device). The store window 208 includes the store name 210 corresponding to the location 206*b*, the price 212 of the item, the address 214 of the store, the phone number 216 of the store, and the hours of the store 218. Also present in the store window 208 are a get directions button 220 and a buy now button 222. Selecting on the get directions button 220 brings up a navigation screen where directions to the store are presented, either graphically or textually (or both). Selecting on the buy now button 222 acts to activate a first step in purchasing the selected item from the selected store.

Figure 3:
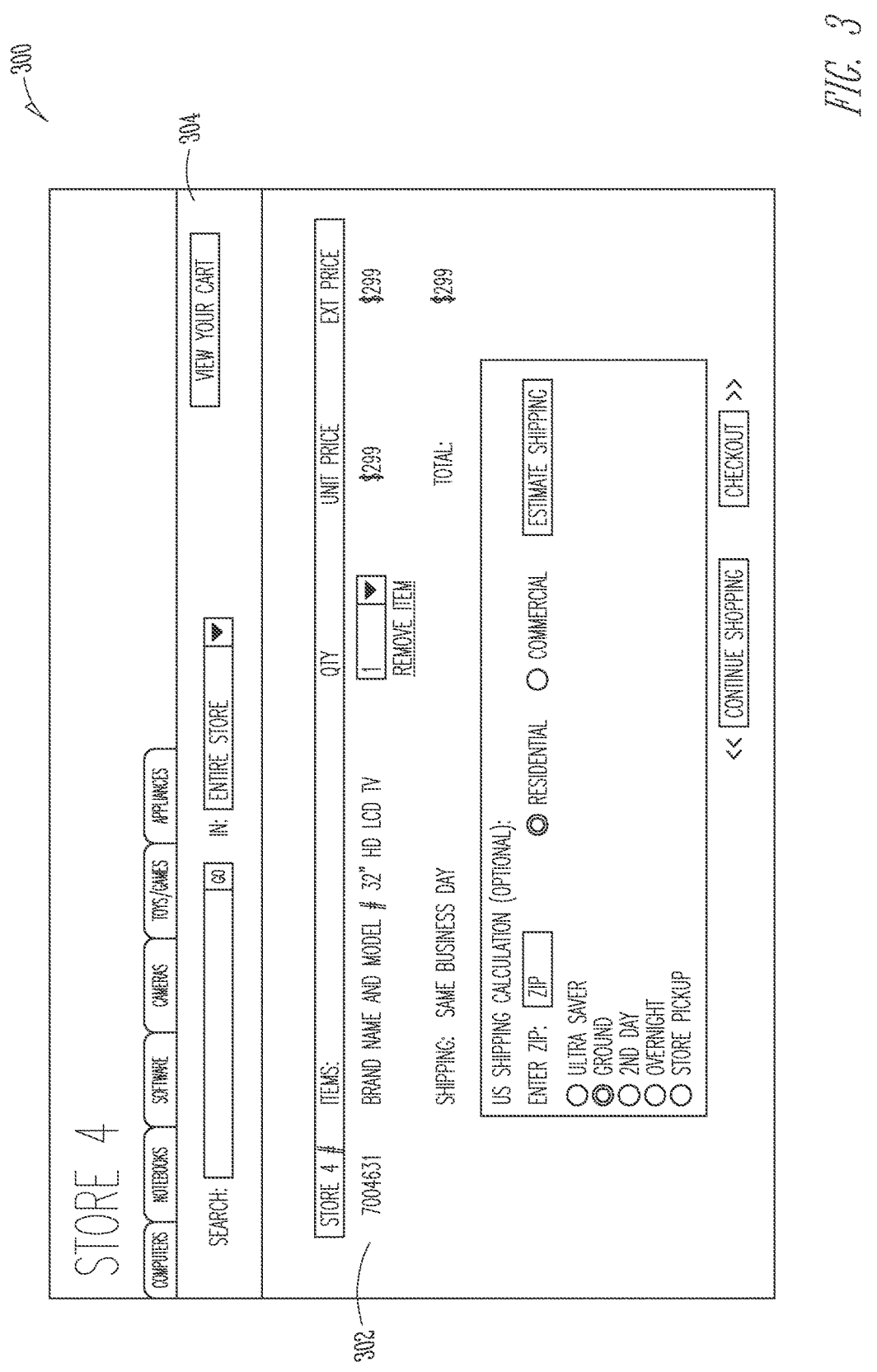

In various different example embodiments, the first step activated by the user selecting the buy now button 222 can vary greatly. FIG. 3 is a screen capture illustrating example output 300 of a method, in accordance with an example embodiment, of a first step of purchasing a selected item. In one example embodiment, the buy now button 222 causes output 300 with the selected item to be added to a shopping cart 302 of a store web site 304 corresponding to the selected store. As will be described later, this may involve executing one or more application programming interfaces (APIs) or pre-established web links that open the store web site. Notably, since the item has already been added to the shopping cart 302, the user may select shipping options.

Figure 4:
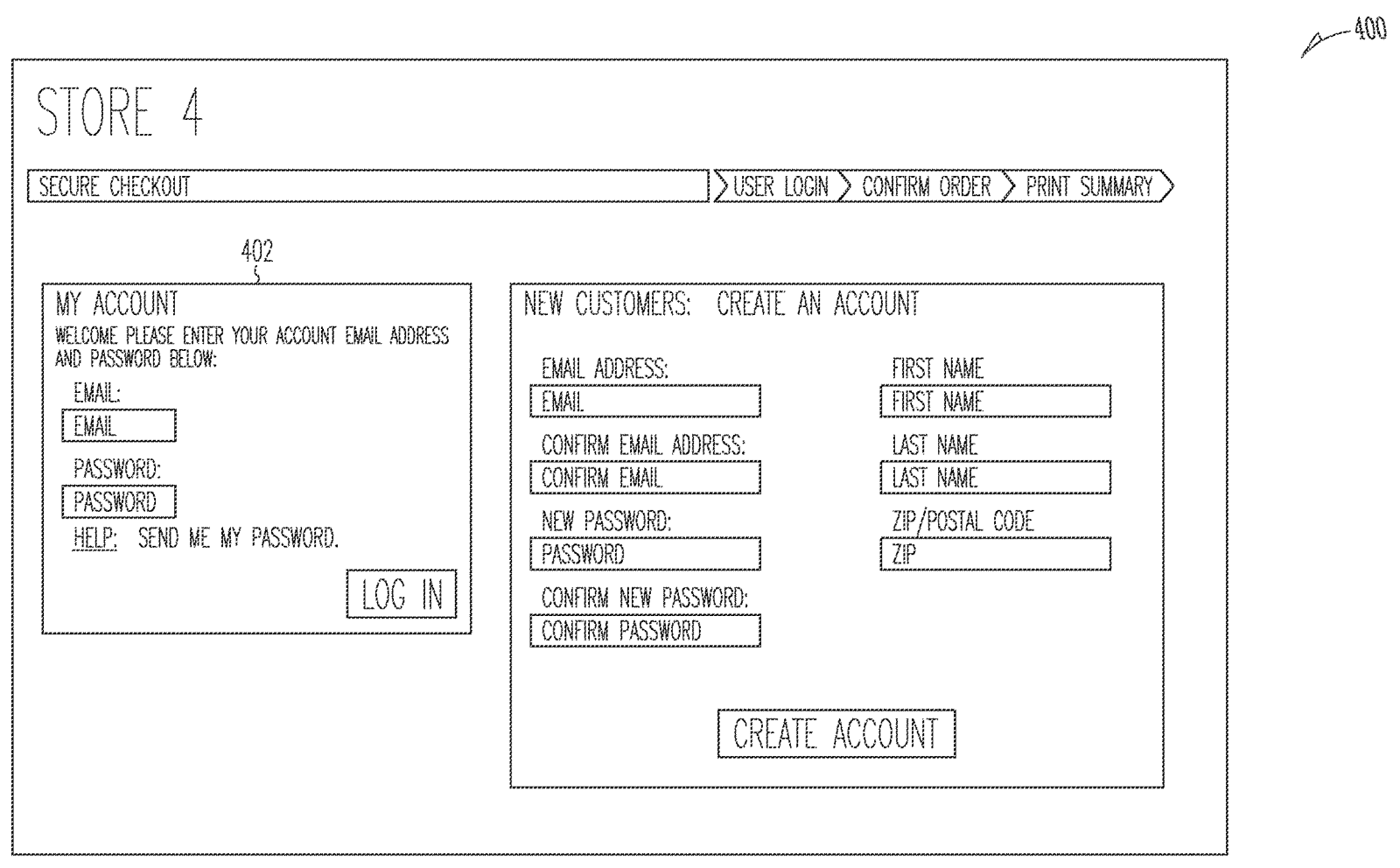

FIG. 4 is a screen capture illustrating additional example output 400 of a method, in accordance with an example embodiment, of purchasing a selected item. Here, the output 400 produces an area 402 where the user is requested to enter log-in information (or create a new account). Many store web sites request this type of information to check out. It should be noted that in some embodiments, the log-in step can be avoided by passing log-in information to the store web site when the user clicks the buy now button 222. This may be accomplished by, for example, storing the log-in information in a data structure, such as a cookie, and configuring the buy now button 222 to retrieve the data structure and pass it to the store web site when activated.

FIG. 5 is a screen capture illustrating additional example output 500 of a method, in accordance with an example embodiment, of purchasing a selected item. Here, the output 500 produces a payment options area 502 and billing address 504 area, where the user can select a method of payment and an address corresponding to the method of payment. Once again, in some embodiments this step can be avoided by passing the information at the time the user clicks the buy now button 222. For example, the user could store credit card and billing address information in a data structure on a user device, and the buy now button 222 can be configured to retrieve this data structure and pass it to the store web site when activated.

The result is that the user has easily purchased the item from a map view of a product search results web page.

It should be noted that there may be some instances where a local store does not have the item in stock. In such instances, when the user selects on a "buy now" button for a store that is far from his or her location (as defined by, for example, a distance radius configurable by the user), then the user may be prompted with shipping options. These options may include, for example, picking the item up at a local store (different than the one in which the store is ordered), shipping the product to the user's home, and shipping the product to a depot for pickup.

FIG. 6 is a screen capture illustrating example output 600 of a method, in accordance with another example embodiment, of a first step of purchasing a selected item. Here, the payment method is already known, either via storage of the payment information locally, by virtue of the fact that the store only takes one form of payment, or by virtue of the store website preconfiguring the payment options for the user. The result is that this output 600 is presented immediately upon the user clicking the buy now button 222. The resulting output 600 contains preconfigured information, and thus the user need simply hit a confirm payment button 602 to confirm the transaction and complete the purchase.

Configuring the buy now button 222 may be performed in a number of different ways, depending on embodiment. Many store web sites can be accessed via either APIs or by direct links. APIs are procedures of code that, when executed, permit data to be passed back and forth. An API, for example, may allow an end user device to directly access a database operated by a store (to retrieve information, for example, and populate a web page).

Figure 7:
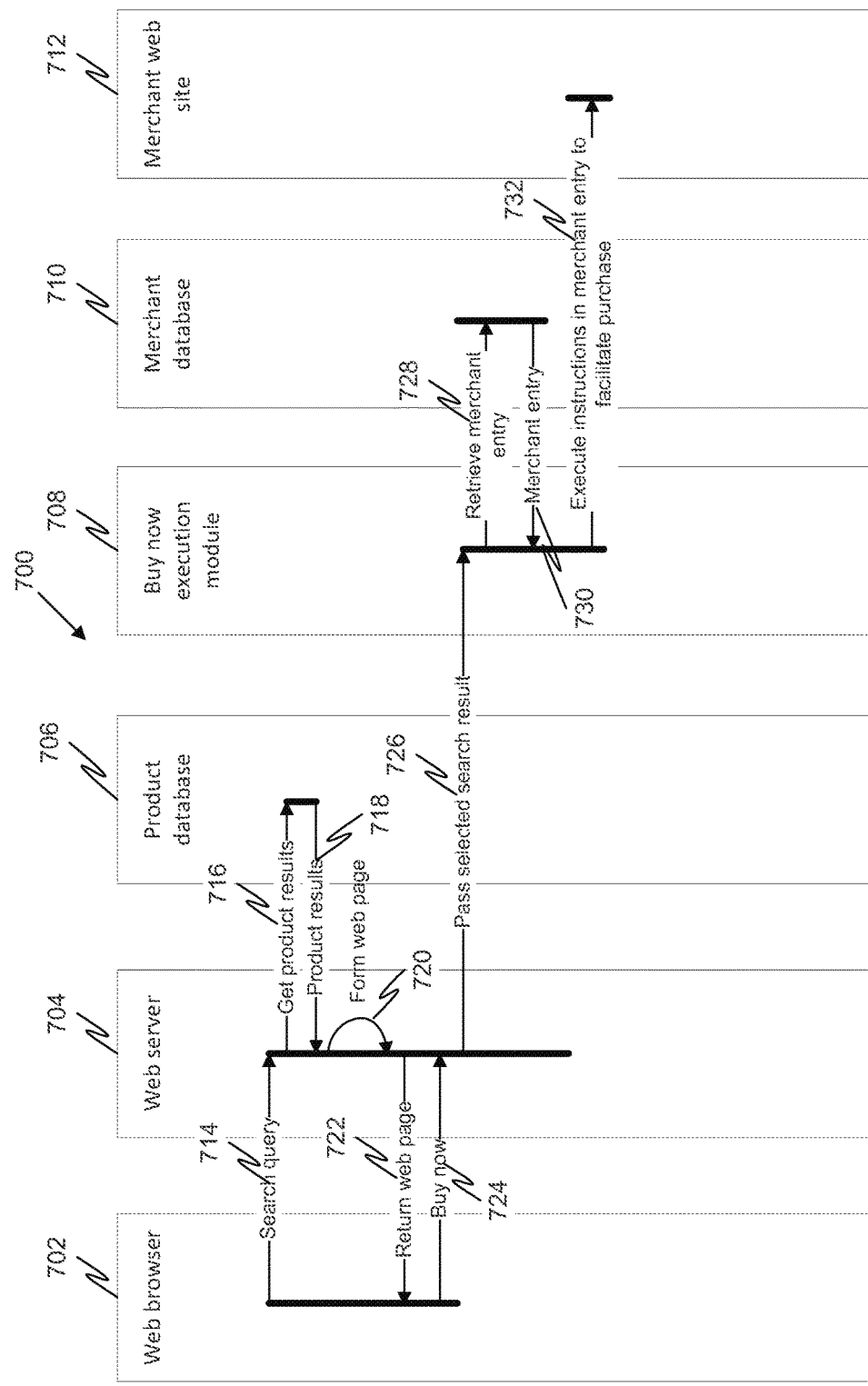
FIG. 7 is an interaction diagram illustrating a method, in accordance with an example embodiment, of presenting product search results.

FIG. 7 is an interaction diagram illustrating a method 700, in accordance with an example embodiment, of presenting product search results. The method 700 involves a web browser 702, a web server 704, a product database 706, a buy now execution module 708, a merchant database 710, and a merchant web site 712. It should be noted that while these are presented as separate components, in some embodiments one or more of these components may be located on the same device. For example, the web server 704 may be located on the same physical server as the product database 706, buy now execution module 708 and merchant database 710.

At 714, a user may perform a product search by entering a search query. This search query can take many forms, including text-based queries, graphical queries, or link-based queries. At 716, the web server 704 acts to retrieve various search results from the product database 706 based on the query. At 718, search results are returned to the web server 704. At 720, the web server 704 forms a web page containing the search results in a map view. This may include presenting the search results as selectable locations in the map view, with the selectable locations each including a buy now button. At 722, the web page is returned to the web browser 702.

At 724, the user selects a search result and a corresponding buy now button. At 726, the web server 704 passes the selected search result to the buy now execution module 708. At 728, the buy now execution module 708 retrieves a merchant entry from the merchant database 710, the merchant entry corresponding to the merchant pertaining to the search result (i.e., the merchant selling the selected product). At 730, the merchant entry is returned to the buy now execution module 708. The merchant entry may, in some embodiments, be a data structure such as a record that includes information about how the buy now execution module 708 should execute a purchase. Since each merchant web site 712 may be different, how the buy now execution module 708 must process the transaction may differ greatly depending on the merchant. For example, one merchant web site may use certain APIs and another merchant web site may use different APIs. Yet another merchant web site may use direct URL links in order to facilitate a purchase. This type of information may be stored in the merchant entry as instructions. At 732, the buy now execution module 708 may execute the instructions from the merchant entry, thus facilitating the purchase of the selected item from the selected search result. In this embodiment, an API call is made to the merchant web site 712 to add the selected item to a shopping cart for the selected merchant web site.

Figure 8:
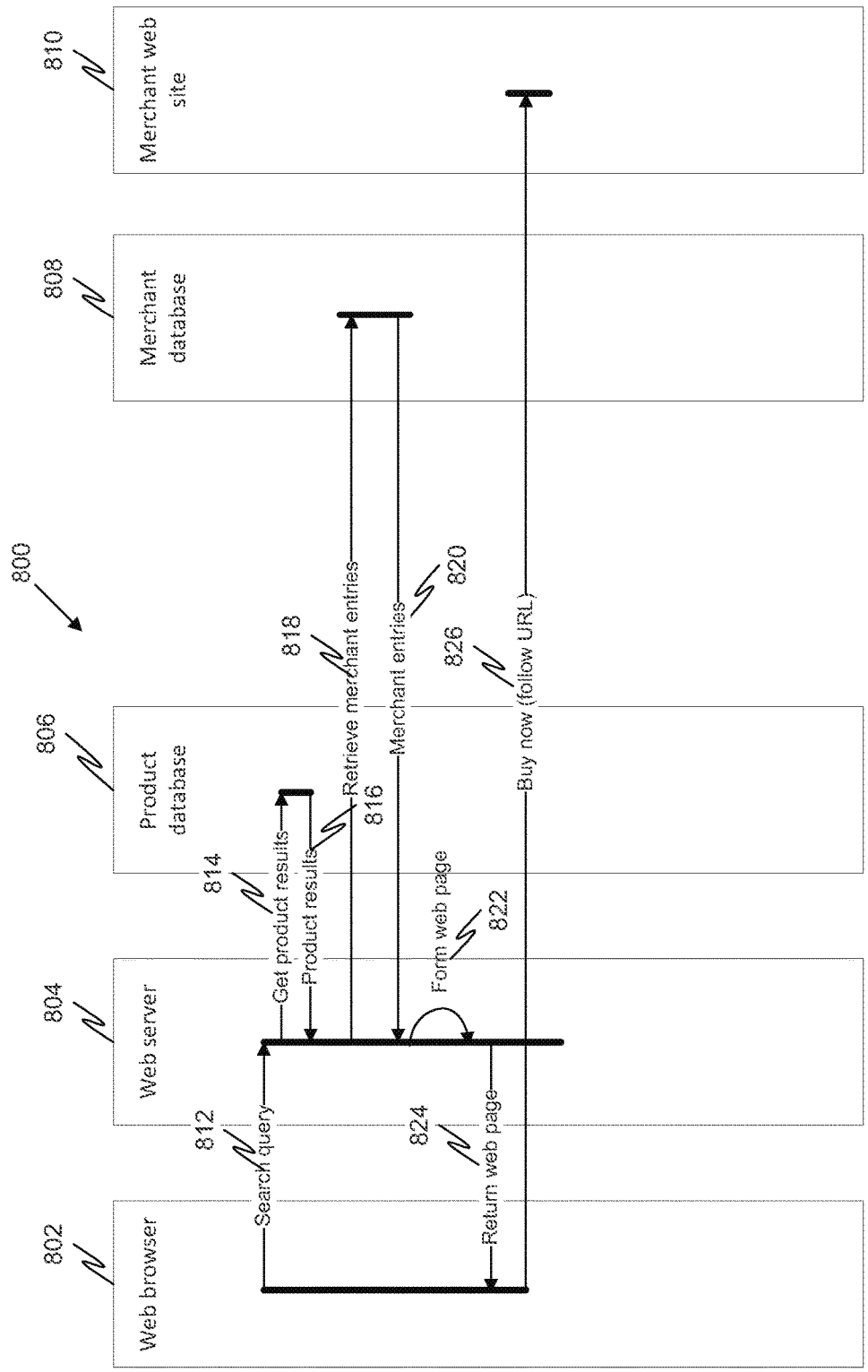
FIG. 8 is an interaction diagram illustrating a method, in accordance with another example embodiment, of presenting product search results.

FIG. 8 is an interaction diagram illustrating a method 800, in accordance with another example embodiment, of presenting product search results. The method 800 involves a web browser 802, a web server 804, a product database 806, a merchant database 808, and a merchant web site 810. At 812, a user may perform a product search by entering a search query. This search query can take many forms, including text-based queries, graphical queries, or link-based queries. At 814, the web server 804 acts to retrieve various search results from the product database 806 based on the query. At 816, search results are returned to the web server 804. At 818, the web server 804 requests merchant entries for each merchant corresponding to a returned search result from the merchant database 810. At 820, the merchant entries are returned. At 822, the web server 804 forms a web page containing the search results in a map view. This may include presenting the search results as selectable locations in the map view, with the selectable locations each including a buy now button, and the buy now button for each selectable location having a script associated with it that is based on the information from the corresponding merchant entry. For example, the merchant entry for a particular merchant may indicate a certain specialized URL is utilized when the buy now button is clicked. This specialized URL then may be part of the script associated with any search results pertaining to that particular merchant. At 824, the web page is returned to the web browser 802.

At 826, the user selects a search result and a corresponding buy now button. This causes the execution of the corresponding script, which passes parameters to the specialized URL at the merchant web site 810, thus facilitating the purchase of the selected item from the selected search result.

Figure 9:
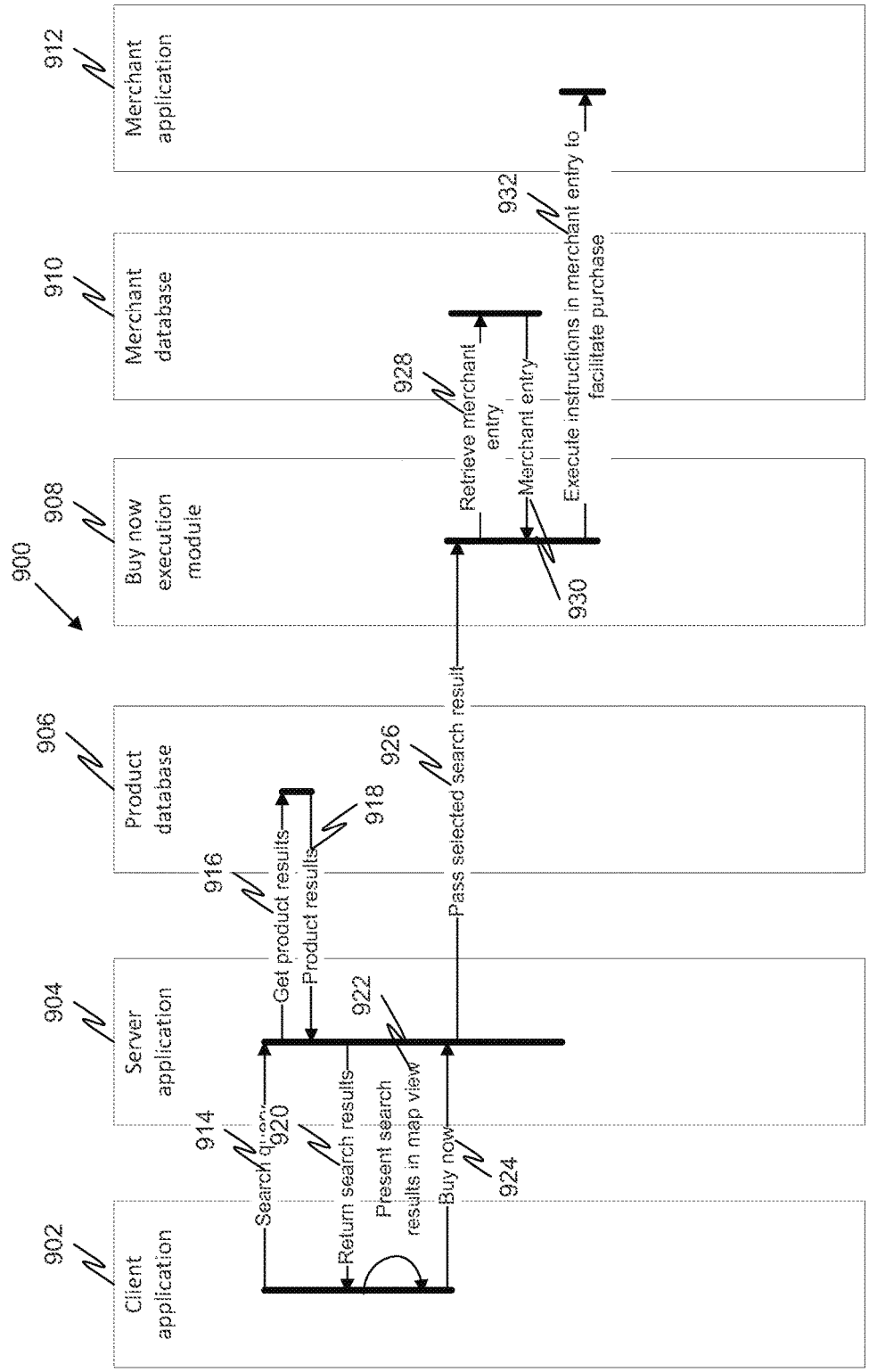
FIG. 9 is an interaction diagram illustrating a method, in accordance with another example embodiment, of presenting product search results.

FIG. 9 is an interaction diagram illustrating a method 900, in accordance with another example embodiment, of presenting product search results. The method 900 involves a client application 902, a server application 904, a product database 906, a buy now execution module 908, a merchant database 910, and a merchant application 912. While the disclosure thus far discusses making purchases on store web sites, there is no necessity that web sites or the World Wide Web be involved at all. For example, in a mobile environment, a specialized non-web browser client application may be used to present product search results in a map view. When the user clicks on a buy now button in the map view, a new window may be brought up allowing the user to check out and purchase the item from the selected store. This all may be accomplished via APIs for the store's databases, which allow the specialized non-web browser application to directly retrieve the appropriate information to facilitate checking out without ever needing to involve a web page or web browser. FIG. 9 illustrates this embodiment.

At 914, a user may perform a product search by entering a search query. This search query can take many forms, including text-based queries, graphical queries, or link-based queries. At 916, the server application 904 acts to retrieve various search results from the product database 906 based on the query. At 918, search results are returned to the server application 904. At 920, the server application 904 returns the search results to the client application 902. At 922, the client application 902 presents the search results in a map view. This may include presenting the search results as selectable locations in the map view, with the selectable locations each including a buy now button.

At 924, the user selects a search result and a corresponding buy now button. At 926, the server application 904 passes the selected search result to the buy now execution module 908. At 928, the buy now execution module 908 retrieves a merchant entry from the merchant database 910, the merchant entry corresponding to the merchant pertaining to the search result (i.e., the merchant selling the selected product). At 930, the merchant entry is returned to the buy now execution module 908. At 932, the buy now execution module 908 may execute the instructions from the merchant entry, thus facilitating the purchase of the selected item from the selected search result. In this embodiment, an API call is made to the merchant application 912 to arrange to purchase the item corresponding to the selected search result.

Figure 10:
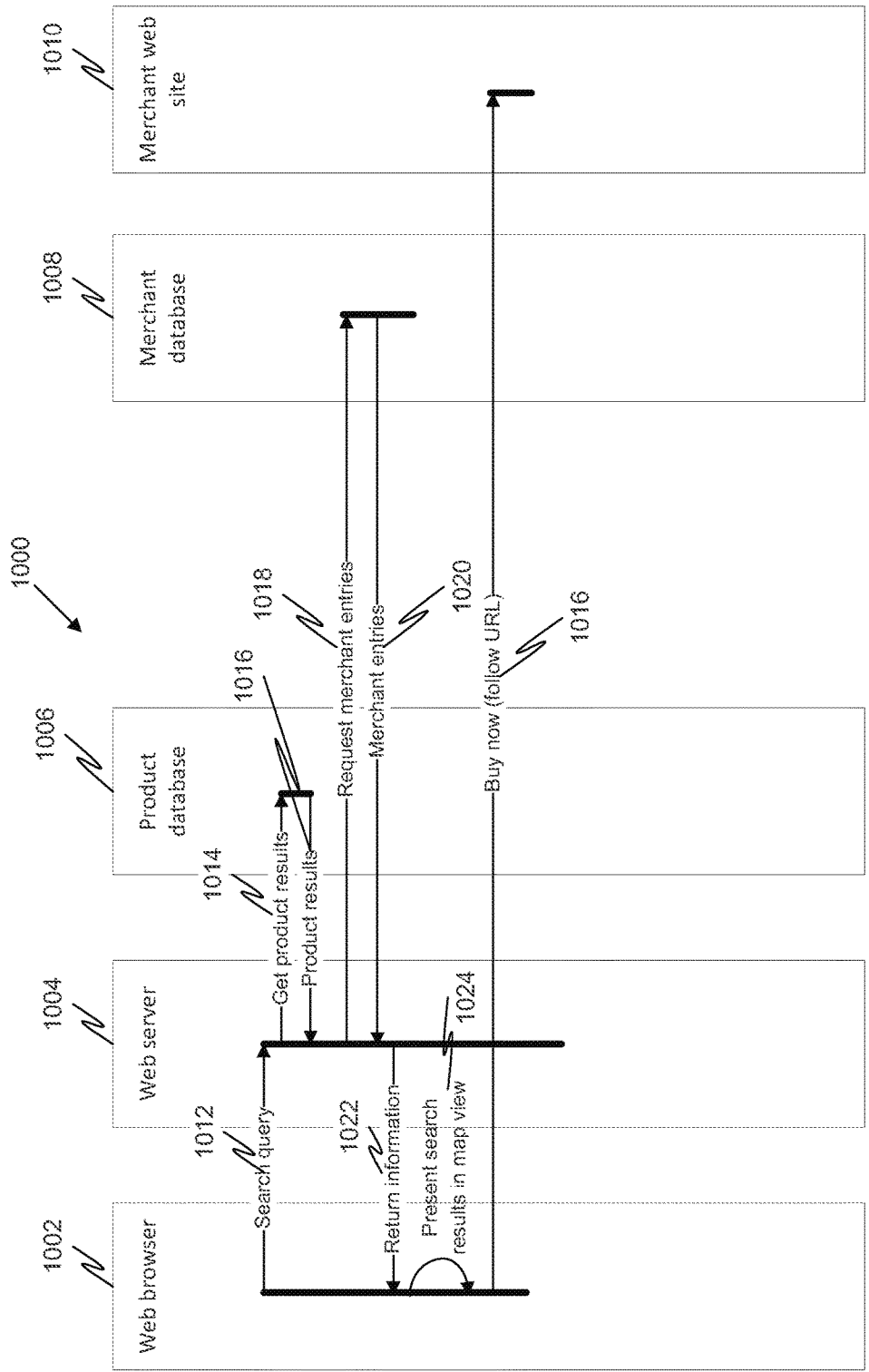
FIG. 10 is an interaction diagram illustrating a method, in accordance with another example embodiment, of presenting product search results.

FIG. 10 is an interaction diagram illustrating a method 1000, in accordance with another example embodiment, of presenting product search results. The method 1000 involves a web browser 1002, a web server 1004, a product database 1006, a merchant database 1008, and a merchant web site 1010.

At 1012, a user may perform a product search by entering a search query. This search query can take many forms, including text-based queries, graphical queries, or link-based queries. At 1014, the web server 1004 acts to retrieve various search results from the product database 1006 based on the query. At 1016, search results are returned to the web server 1004. At 1018, the web server 1004 requests merchant entries for each merchant corresponding to a returned search result from the merchant database 1008. At 1020, the merchant entries are returned. At 1022, the web server 1004 returns information necessary for, at 1024, the web browser 1002 to display the search results in a map view. This may include presenting the search results as selectable locations in the map view, with the selectable locations each including a buy now button, and the buy now button for each selectable location having a script associated with it that is based on the information from the corresponding merchant entry. For example, the merchant entry for a particular merchant may indicate a certain specialized URL is utilized when the buy now button is clicked. This specialized URL then may be part of the script associated with any search results pertaining to that particular merchant. At 1024, the user selects a search result and a corresponding buy now button. This causes the execution of the corresponding script, which passes parameters to the specialized URL at the merchant web site 1010, thus facilitating the purchase of the selected item from the selected search result.

Figure 11:
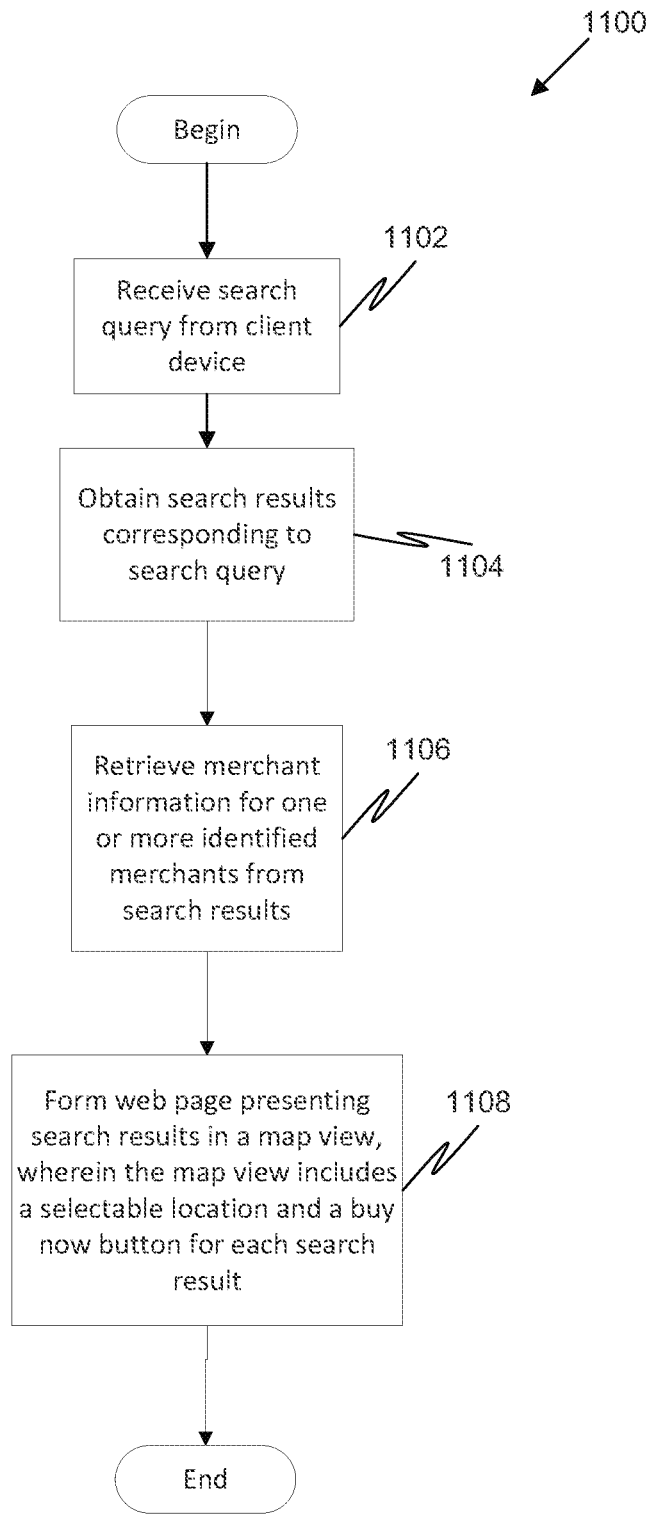
FIG. 11 is a flow diagram illustrating a method, in accordance with an example embodiment, of presenting product search results.

FIG. 11 is a flow diagram illustrating a method 1100, in accordance with an example embodiment, of presenting product search results. The method 1100 may be performed by, for example, a server. At 1102, a search query is received from a client device. At 1104, search results corresponding to the search query are obtained, each search result identifying a merchant. At 1106, merchant information for one or more of the identified merchants from the search results may be retrieved from a merchant database. At 1108, a web page may be formed presenting the search results in a map view, wherein the map view includes a selectable location and a buy now button for each search result.

The buy now button may be formed using the merchant information for the merchant identified for the corresponding search result and, when selected, causes a purchase transaction to be initiated on a merchant web site.

Figure 12:
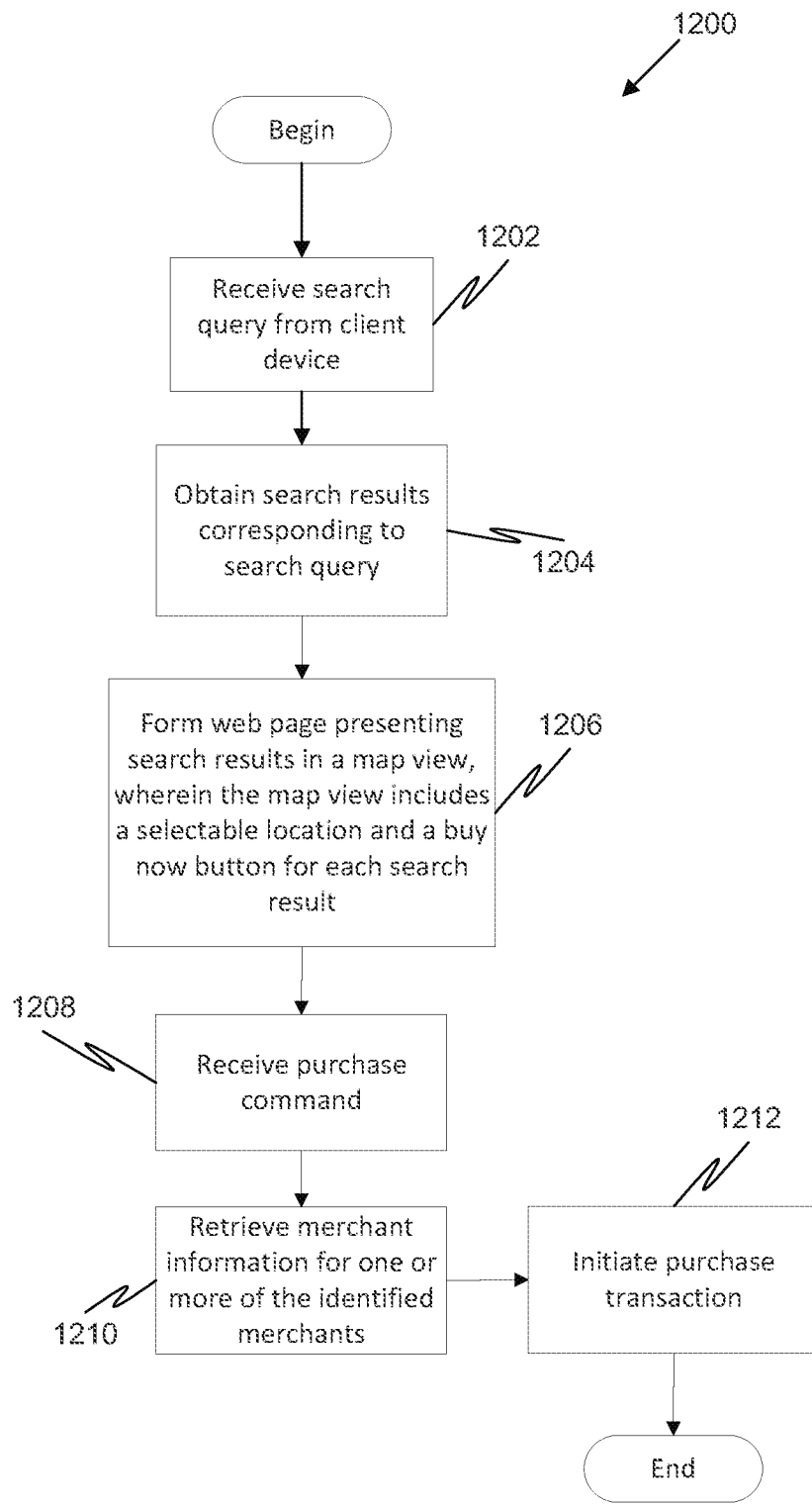
FIG. 12 is a flow diagram illustrating a method, in accordance with another example embodiment, of presenting product search results.

FIG. 12 is a flow diagram illustrating a method 1200, in accordance with another example embodiment, of presenting product search results. The method 1200 may be performed by, for example, a server. At 1202, a search query is received from a client device. At 1204, search results corresponding to the search query are obtained, each search result identifying a merchant. At 1206, a web page may be formed presenting the search results in a map view, wherein the map view includes a selectable location and a buy now button for each search result. The buy now button causes, when selected, a purchase command to be issued.

At 1208, the purchase command is received. At 1210, merchant information for one or more of the identified merchants from the search results is retrieved from a merchant database. At 1212, a purchase transaction may be initiated on a merchant web site using the merchant information.

Figure 13:
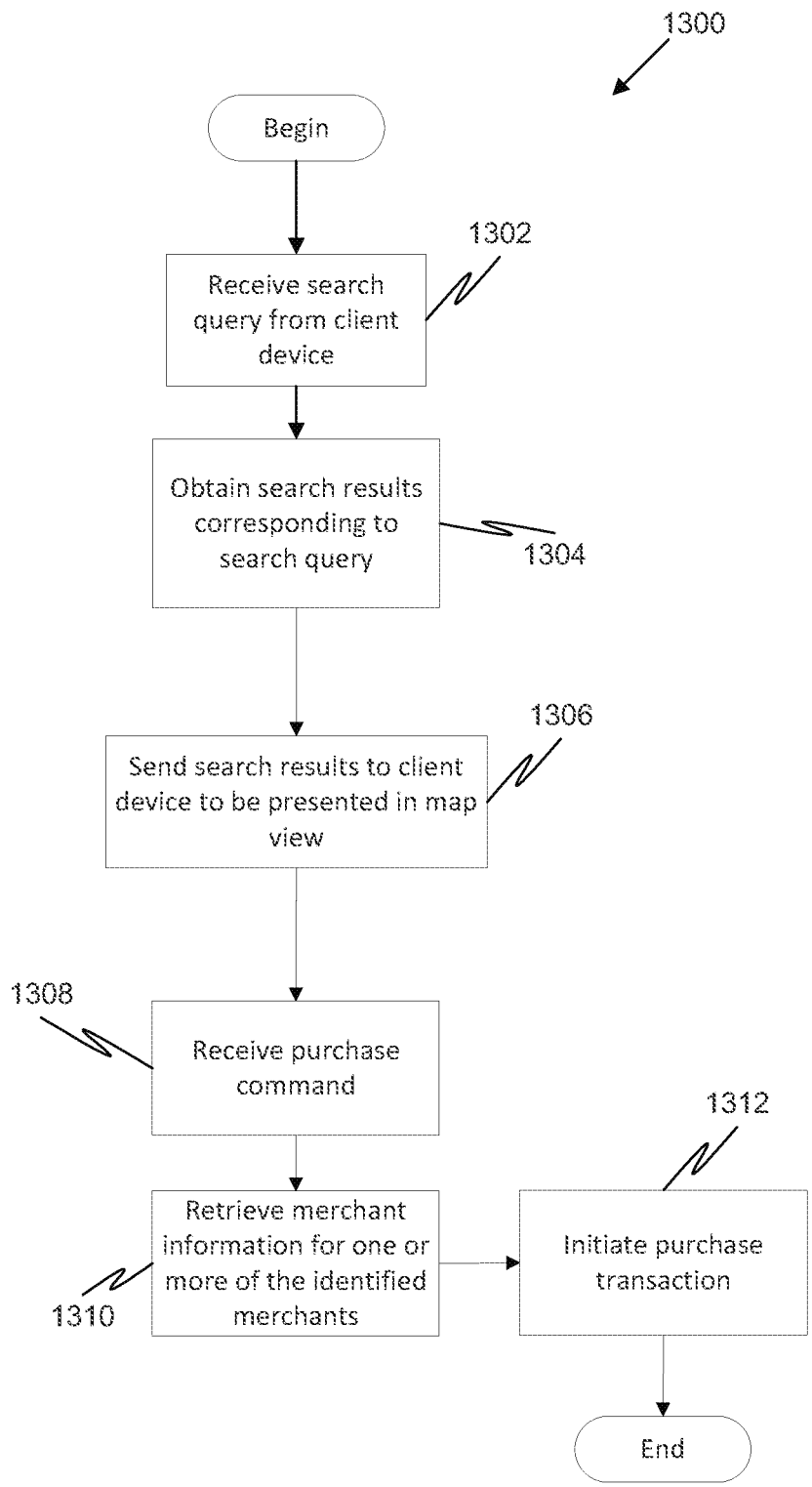
FIG. 13 is a flow diagram illustrating a method, in accordance with another example embodiment, of presenting product search results.

FIG. 13 is a flow diagram illustrating a method 1300, in accordance with another example embodiment, of presenting product search results. The method 1300 may be performed by, for example, a server. At 1302, a search query is received from a client device. At 1304, search results corresponding to the search query are obtained, each search result identifying a merchant. At 1306, the search results are sent to the client device to be presented in a map view, wherein the map view includes a selectable location and a buy now button for each search result, wherein the buy now button is formed using the merchant information for the merchant identified for the corresponding search result and, when selected, causes a purchase command to be issued. At 1308, the purchase command is received. At 1310, merchant information for one or more of the identified merchants from the search results is retrieved from a merchant database. At 1312, a purchase transaction is initiated using the merchant information.

Figure 14:
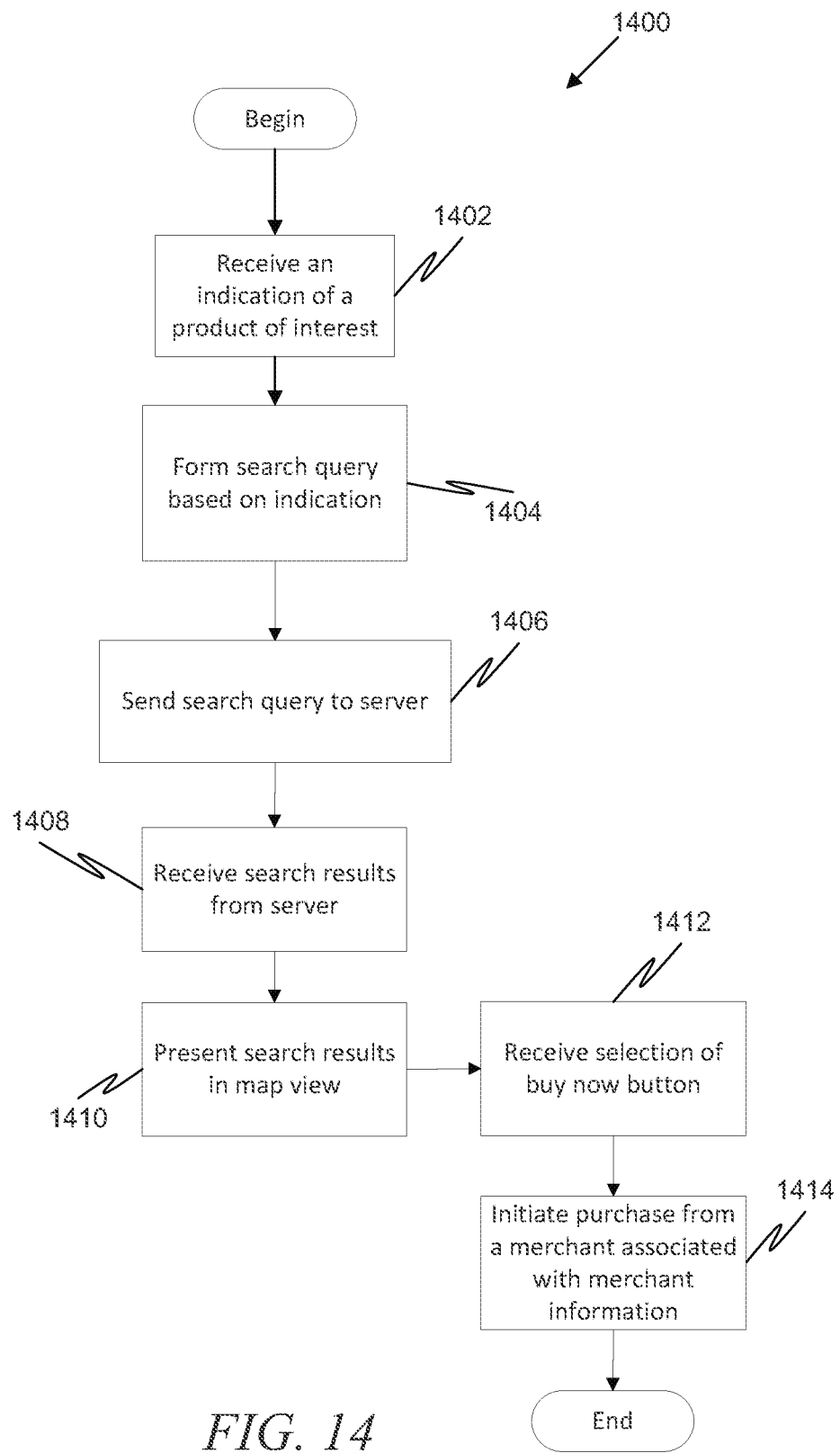
FIG. 14 is a flow diagram illustrating a method, in accordance with another example embodiment, of presenting product search results.

FIG. 14 is a flow diagram illustrating a method 1400, in accordance with an example embodiment, of presenting product search results. The method 1400 may be performed by, for example, a client device. At 1402, an indication is received from a user as to a product of interest. At 1404, a search query is formed based on the indication. At 1406, the search query is sent to a server. At 1408, search results are received from the server, the search results including merchant information. The merchant information can include a location and purchase instructions. At 1410, the search results are presented in a map view. The map view may include a selectable location for each search result using the location from the merchant information and a buy now button for each search result using the purchase instructions for the merchant identified for the corresponding search result.

At 1412, a selection of a buy now button is received. At 1414, a purchase from a merchant associated with the merchant information is initiated by executing the purchase instructions contained in the merchant information.

Figure 15:
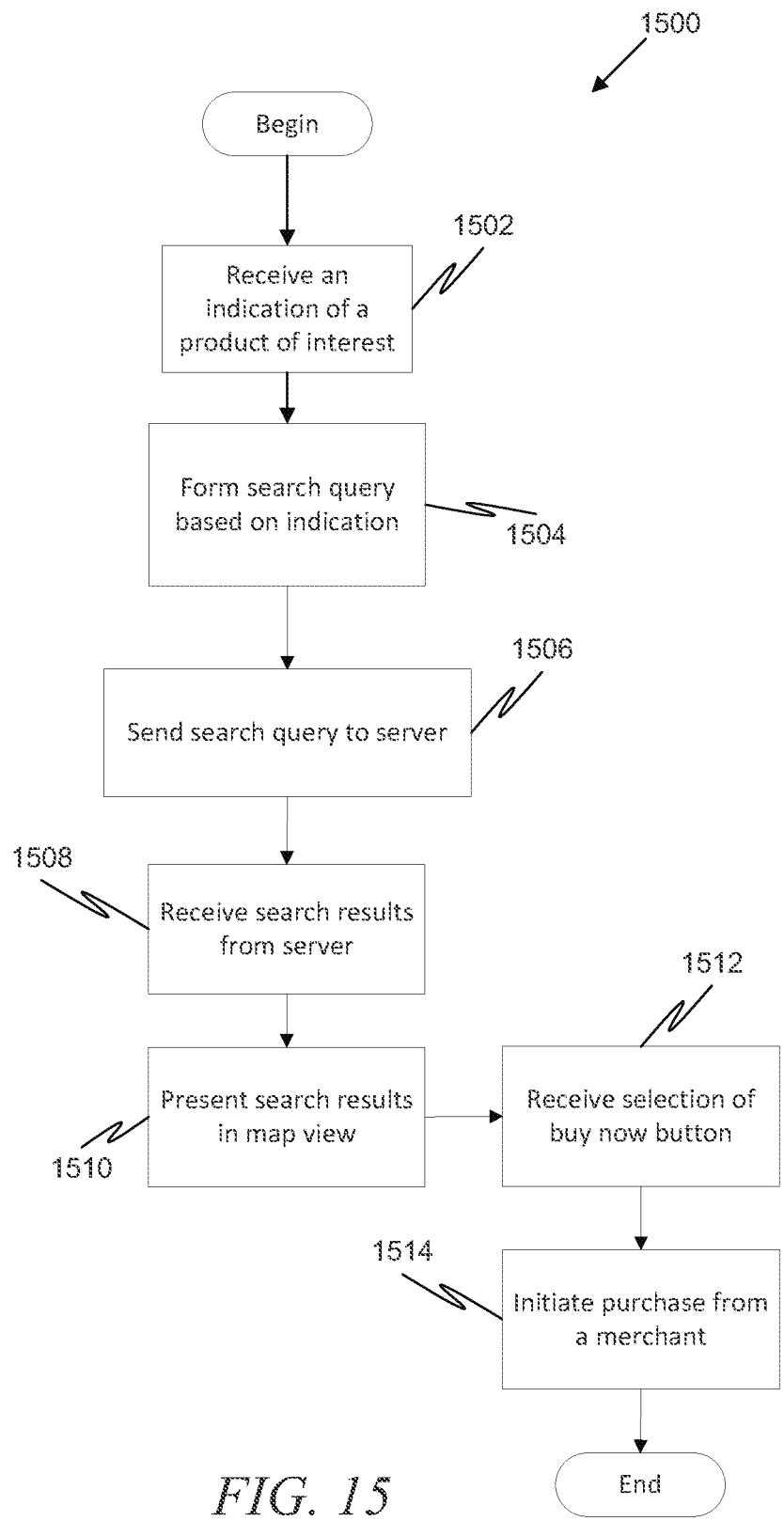
FIG. 15 is a flow diagram illustrating a method, in accordance with another example embodiment, of presenting product search results.

FIG. 15 is a flow diagram illustrating a method 1500, in accordance with another example embodiment, of presenting product search results. The method 1500 may be performed by, for example, a client device. At 1502, an indication is received from a user as to a product of interest. At 1504, a search query is formed based on the indication. At 1506, the search query is sent to a server. At 1508, search results are received from the server, the search results including merchant information. The merchant information can include a location. At 1510, the search results are presented in a map view. The map view may include a selectable location for each search result using the location from the merchant information and a buy now button for each search result At 1512, a selection of a buy now button is received. At 1514, a purchase from a merchant associated with the merchant information is initiated by, for example, sending instructions to a buy now execution module.

Figure 16:
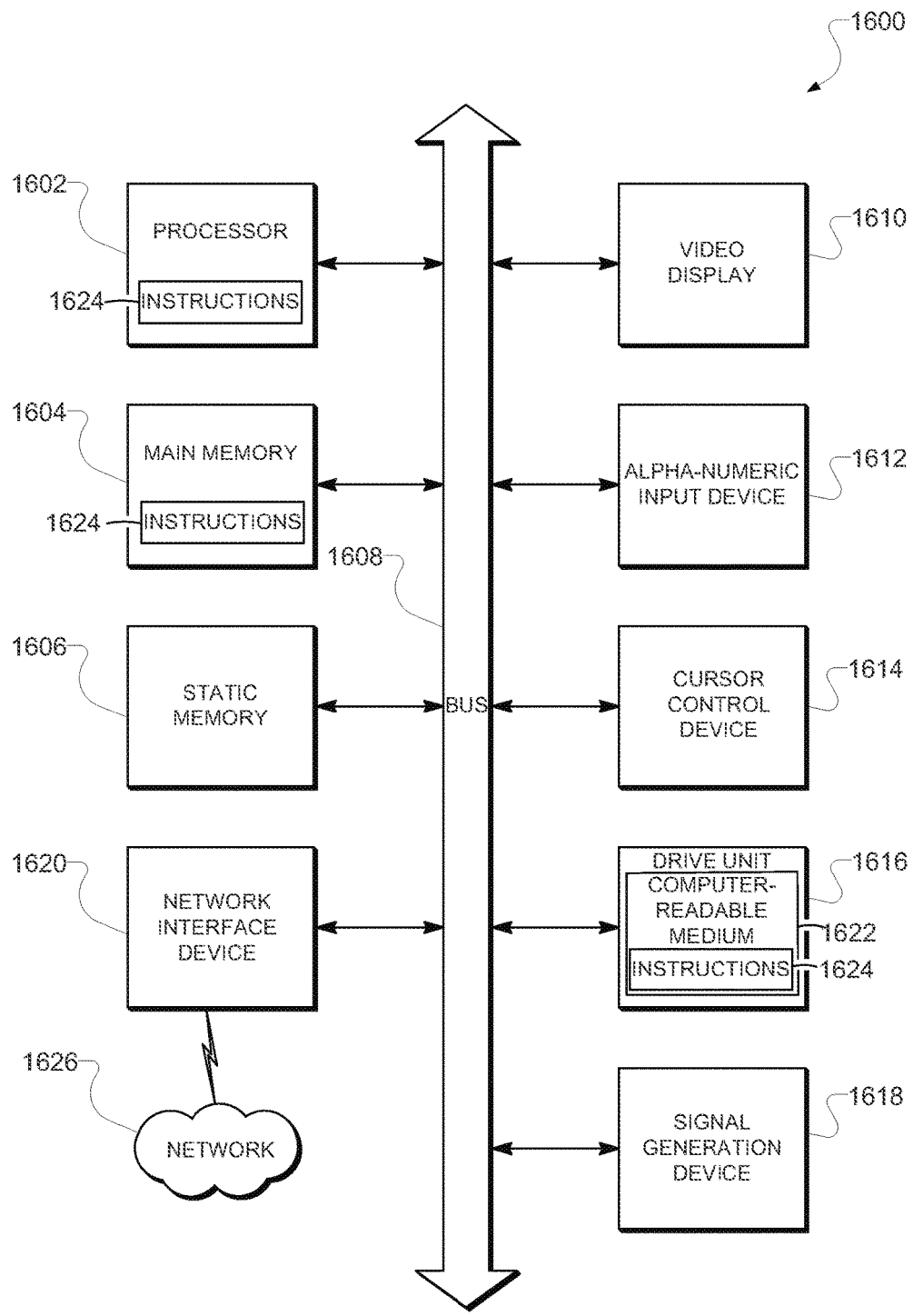
FIG. 16 shows a diagrammatic representation of a machine in the example form of a computer system within which a set of instructions, for causing the machine to perform any one or more of the methodologies discussed herein, may be executed.

FIG. 16 shows a diagrammatic representation of a machine in the example form of a computer system 1600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., a central processing unit (CPU) a graphics processing unit (GPU) or both), a main memory 1604 and a static memory 1606, which communicate with each other via a bus 1608. The computer system 1600 may further include a video display unit 1610 (e.g., a liquid crystal display (LCD) or a cathode ray tube (CRT)). The computer system 1600 also includes an alphanumeric input device 1612 (e.g., a keyboard), a cursor control device 1614 (e.g., a mouse), a disk drive unit 1616, a signal generation device 1618 (e.g., a speaker) and a network interface device 1620.

The disk drive unit 1616 includes a machine-readable medium 1622 on which is stored one or more sets of instructions (e.g., software 1624) embodying any one or more of the methodologies or functions described herein. The software 1624 may also reside, completely or at least partially, within the main memory 1604, static memory 1606 and/or within the processor 1602 during execution thereof by the computer system 1600, the main memory 1604, static memory 1606 and the processor 1602 also constituting machine-readable media.

The software 1624 may further be transmitted or received over a network 1626 via the network interface device 1620.

While the machine-readable medium 1622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 107 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A client device comprising:
one or more processors; and
a memory storing instructions executable by the one or more processors to:
receive log-in information from a user;
store the log-in information in a first data structure on the client device;
send a search query to a server device;
receive one or more search results from the server device in response to the search query;
present the one or more search results in a user interface on a display of the client device, with each search result including a button;
receive a selection of a button corresponding to a search result of the one or more search results;
in response to the receiving of the selection of the button corresponding to the search result of the one or more search results, send log-in information stored in the first data structure to the server device and cause the server device to retrieve and execute transaction instructions corresponding to the search result of the one or more search results using the sent log-in information stored in the first data structure.

2. The client device of claim 1, wherein the user interface screen is a map view where each search result is presented in the map view at a location associated with the corresponding search result, wherein the location is selectable via the user interface screen.

3. The client device of claim 1, wherein the first data structure is a cookie.

4. The client device of claim 1, wherein the one or more search results correspond to items for sale.

5. The client device of claim 1, wherein the one or more search results correspond to services being offered.

6. The client device of claim 1, wherein the button corresponding to the search result of the one or more search results is a buy now button.

7. The client device of claim 1, wherein the client device is a mobile device.

8. A method of presenting search results, the method comprising:
   receiving, at a server device, log-in information from a client device;
   causing the client device to store the log-in information in a first data structure in a storage local to the client device;
   receiving a search query from the client device;
   obtaining search results corresponding to the search query, each search result identifying a transaction having a transaction provider;
   retrieving transaction provider information for one or more of the identified transaction providers from the search results, the transaction provider information including transaction instructions; and
   forming a user interface screen presenting the search results including a button associated with each search result, each button configured to, in response to selection of the button, initiate a transaction through the corresponding transaction provider, wherein the initiating includes executing the transaction instructions contained in the transaction provider information for the corresponding transaction provider, the initiation of the transaction further including the server device passing information regarding log-in information for a user of the client device, based on the first data structure, to the transaction provider.

9. The method of claim 8, wherein the user interface screen is a map view where each search result is presented in the map view at a location associated with the corresponding search result, wherein the location is selectable via the user interface screen.

10. The method of claim 8, wherein the first data structure is a cookie.

11. The method of claim 8, wherein one or more of the search results correspond to items for sale.

12. The method of claim 8, wherein one or more of the search results correspond to services being offered.

13. The method of claim 8, wherein the button is a buy now button.

14. The method of claim 8, wherein the client device is a mobile device.

15. A non-transitory machine-readable storage medium having embodied thereon instructions executable by one or more machines to perform operations comprising:
   receiving, at a server device, log-in information from a client device;
   causing the client device to store the log-in information in a first data structure in a storage local to the client device;
   receiving a search query from the client device;
   obtaining search results corresponding to the search query, each search result identifying a transaction having a transaction provider;
   retrieving transaction provider information for one or more of the identified transaction providers from the search results, the transaction provider information including transaction instructions; and
   forming a user interface screen presenting the search results including a button associated with each search result, each button configured to, in response to selection of the button, initiate a transaction through the corresponding transaction provider, wherein the initiating includes executing the transaction instructions contained in the transaction provider information for the corresponding transaction provider, the initiation of the transaction further including the server device passing information regarding log-in information for a user of the client device, based on the first data structure, to the transaction provider.

16. The non-transitory machine-readable storage medium of claim 15, wherein the user interface screen is a map view where each search result is presented in the map view at a location associated with the corresponding search result, wherein the location is selectable via the user interface screen.

17. The non-transitory machine-readable storage medium of claim 15, wherein the first data structure is a cookie.

18. The non-transitory machine-readable storage medium of claim 15, wherein one or more of the search results correspond to items for sale.

19. The non-transitory machine-readable storage medium of claim 15, wherein one or more of the search results correspond to services being offered.

20. The non-transitory machine-readable storage medium of claim 15, wherein the button is a buy now button.

* * * * *